United States Patent
Bechtel

(10) Patent No.: US 10,614,978 B2
(45) Date of Patent: Apr. 7, 2020

(54) ROCKER SWITCH ELEMENT FOR MOTOR VEHICLES WITH PROTECTION AGAINST UNWANTED ACTUATION

(71) Applicant: Ford Global Technologies, LLC, Dearborn, MI (US)

(72) Inventor: Nikolaus Alexander Bechtel, Bergisch Gladbach (DE)

(73) Assignee: Ford Global Technologies, LLC, Dearborn, MI (US)

( * ) Notice: Subject to any disclaimer, the term of this patent is extended or adjusted under 35 U.S.C. 154(b) by 224 days.

(21) Appl. No.: 15/806,519

(22) Filed: Nov. 8, 2017

(65) Prior Publication Data

US 2018/0151316 A1    May 31, 2018

(30) Foreign Application Priority Data

Nov. 28, 2016    (DE) .......................... 10 2016 223 572

(51) Int. Cl.
| | |
|---|---|
| *H01H 23/08* | (2006.01) |
| *B60K 37/06* | (2006.01) |
| *B60R 16/00* | (2006.01) |
| *H01H 23/28* | (2006.01) |

(52) U.S. Cl.
CPC ............ *H01H 23/08* (2013.01); *B60K 37/06* (2013.01); *B60R 16/005* (2013.01); *H01H 23/28* (2013.01); *B60K 2370/131* (2019.05); *B60K 2370/199* (2019.05); *H01H 2221/06* (2013.01); *H01H 2221/068* (2013.01); *H01H 2221/088* (2013.01); *H01H 2239/03* (2013.01); *H01H 2239/074* (2013.01); *H01H 2300/006* (2013.01)

(58) Field of Classification Search
CPC ........ H01H 23/08; H01H 23/28; B60K 37/06; B60R 16/005
USPC ......................................................... 200/339
See application file for complete search history.

(56) References Cited

FOREIGN PATENT DOCUMENTS

| DE | 4309492 C1 | 9/1994 | |
|---|---|---|---|
| KR | 1020070133188 | * 11/2007 | ............. H01H 23/02 |
| KR | 1020090065728 A | 6/2009 | |

OTHER PUBLICATIONS

Spiegel, "Citroen C4: Hat Man Da Noch Tone?" www.spiegel.de, Oct. 19, 2010, 3 pages.

* cited by examiner

*Primary Examiner* — Edwin A. Leon
*Assistant Examiner* — Iman Malakooti
(74) *Attorney, Agent, or Firm* — David Coppiellie; Price Heneveld LLP

(57) ABSTRACT

A rocker switching control element for electrical sliding roofs on a vehicle overhead panel has an actuation rocker formed as a switch with switching positions and is arranged on a substantially planar control panel. The actuation rocker is recessed such that it does not project beyond the panel edge region. The transition between the panel edge region and the actuation rocker is formed with the panel edge region forming over a first width a goblet-like edge set back by a first depth, and an adjoining edge, separated by a gap of width, of the actuation rocker, which edge is recessed by more than the first depth in the non-actuated state and set further back continuously over a second width by a second depth. The recess is shaped overall such that inadvertent actuation of the actuation rocker by an object significantly larger than a human finger is prevented.

17 Claims, 2 Drawing Sheets

ROCKER SWITCH ELEMENT FOR MOTOR VEHICLES WITH PROTECTION AGAINST UNWANTED ACTUATION

FIELD OF THE INVENTION

The present invention generally relates to a rocker switching element, in particular as a control element in motor vehicle interiors, having an actuation rocker which is formed as a switch with at least two switching positions and arranged on a control panel, the control panel being of substantially planar form at least in its panel edge region adjoining the rocker switching element.

BACKGROUND OF THE INVENTION

In passenger cars, it has commonly become an established practice for sliding roofs or comparable devices to be opened, to be closed or to be brought into a tilt/ventilation position electrically. The required anti-trapping protection, in particular during the closing operation, is often achieved in that, at least for the closing direction, the electrical actuation takes the form of a switch with a type of dead-man control function, in which the closing movement stops immediately when the switch is released. In order to form the control elements in a logical manner for the user, it has also become established practice to provide the corresponding actuation switch on the so-called overhead panel on the roof lining of the passenger car interior in a region in front of the fastening point of the interior mirror, there generally also being provided on this panel further elements, such as reading and interior lamps and the control elements thereof.

Generally, it cannot be ruled out that children or infants (in particular also because of certain child seat constructions) may inadvertently actuate, for example with their knees, corresponding switches on the overhead panels, this then entailing corresponding risks of injury during an unexpected movement of, for example, a sliding roof. Therefore, a normal requirement in the development of corresponding overhead panels with control switches for such safety-critical elements is for it not to be possible to effectively actuate such switches with a test body, specifically in general with a ball which has a diameter of 40 mm and which is intended to simulate the human body parts such as a knee, a foot or an elbow (even of an infant).

In the case of such products, the design requirement was generally met in the past by means of additional projecting lateral webs at the switches. The webs generally prevent a corresponding test body, and thus in practice also corresponding body parts, from touching the actual actuation element of the switch and consequently triggering a switching operation. However, such webs may be rather unsatisfactory in an esthetic sense. Moreover, a vehicle user can become caught thereon or strike thereagainst, in particular in the case of crash scenarios. Furthermore, the regular operability of the switch is hindered somewhat, in particular when attempting "blind actuation."

Alternatively, in the case of other passenger cars, the problem outlined above has been rectified in that a corresponding slide switch was arranged to be recessed in a corresponding recess of the overhead panel, with the result that a test body cannot engage far enough into the recess in order to touch the actuation element. This solution likewise has some disadvantages. This is rather unsatisfactory in an esthetic sense and further not necessarily suitable for intuitive operation in the case of poor lighting conditions or without looking away from the road, because a user first has to feel the recess and then has to push the control element forward or back. It would be desirable to provide an enhanced solution, in a haptic and esthetic sense and in terms of crash safety, for such a rocker switching element with erroneous-operation protection.

SUMMARY OF THE INVENTION

According to one aspect of the present invention, a rocker switching element as a control element in motor vehicle interiors is provided. The rocker switching element includes an actuation rocker formed as a switch with at least two switching positions. The rocker switching element also includes a control panel of substantially planar form at least in its panel edge region adjoining the rocker switching element, the actuation rocker arranged on the control panel to be recessed such that it does not project beyond the panel edge region at least in the non-actuated state, wherein with regard to a height profile, a transition between the panel edge region and the actuation rocker. The actuation rocker is formed in section as follows: starting from a surrounding panel level, the panel edge region forms over a first width a goblet-like edge which is set back by a first depth, and an adjoining edge, separated by a gap, of the actuation rocker, which edge is recessed by slightly more than the first depth in the non-actuated state, is, in continuation of the goblet-like recess, set further back continuously over a second width by a second depth until a maximum depth is reached, the recess being shaped overall such that inadvertent actuation of the actuation rocker by an object which is significantly larger than a human finger is prevented.

According to another aspect of the present invention, a rocker switching element is provided. The rocker switching element includes an actuation rocker formed as a switch with at least two switching positions and recessed in a substantially planar control panel, wherein a panel edge region forms over a first width a first edge set back by a first depth, and an adjoining second edge is separated by a gap and recessed more than the first depth and set further back continuously over a second width by a second depth.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
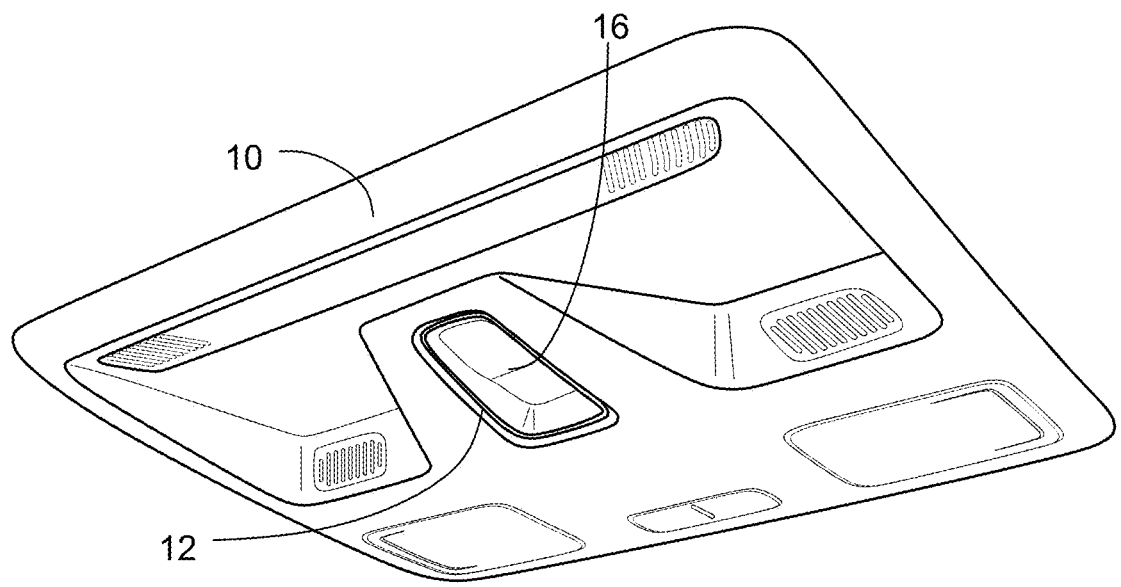
FIG. 1 is a perspective schematic view (in the 3D model) of an overhead console having a rocker switching element according to one embodiment.

Referring to FIG. 1, a 3D model of an overhead console, denoted overall with "10," or of an overhead panel for a motor vehicle having a rocker switching element 12 according to one embodiment is illustrated. The rocker switching element 12 has an actuation rocker 16 that serves for the opening/closing (or for the adopting of a ventilation/tilt position) of an electrical sliding roof, according to one embodiment. Furthermore, further elements are shown provided on the overhead console, such as reading lamps and the control elements thereof, which, however, are optional and therefore generally not of interest in the present case.

The overhead console 10 is arranged in a vehicle on the roof lining in a substantially horizontal manner, but has regions which are variously formed and are arranged to be at different angles and with a slight deviation with respect to the horizontal. The immediate surroundings or the edge around the rocker switching element 12 is in this embodiment of substantially planar form. "Substantially" is in this context intended to indicate that a slight curvature of the panel over the extent of the rocker switching element 12 is possible. Compared with the 3D model illustrated in FIG. 1, inscriptions or symbols are additionally present on the individual elements in practice, for example inscriptions such as "Open/Close" in the case of the rocker switching element.

Figure 2:
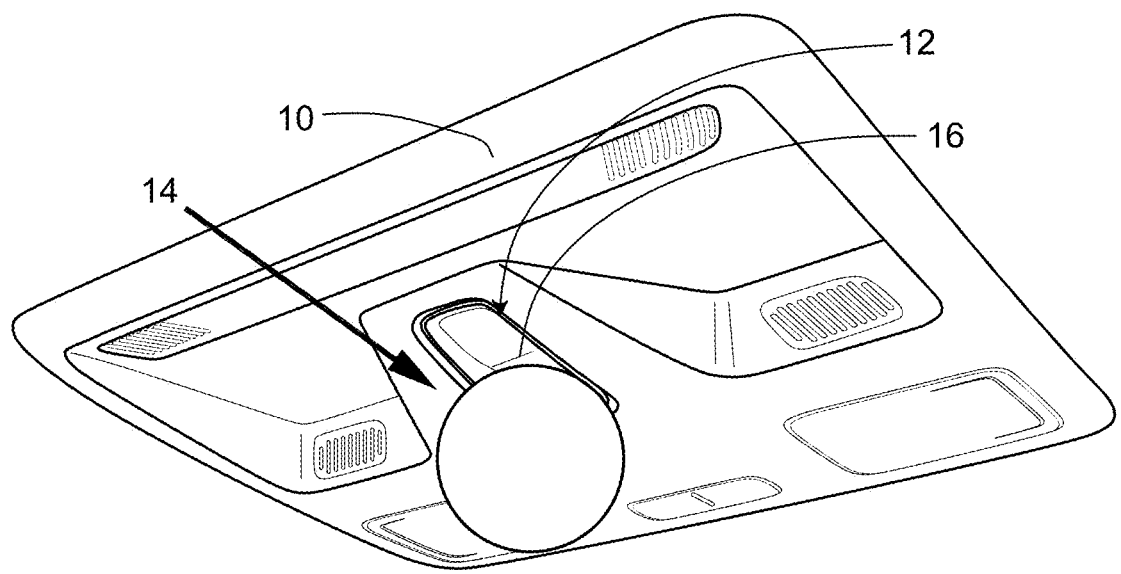
FIG. 2 is a perspective view of the overhead console of FIG. 1 with an applied test body.

The rocker switching element 12 is arranged so as to be recessed, as will be discussed in even more detail below. The arrangement is in particular formed in such a way that a test body, denoted in FIG. 2 with "14," specifically a solid ball with a 40 mm diameter, according to one example, is not able to enter so far into the recess in any orientation that the rocker switching element 12 can be actuated, whereby inadvertent actuation, for example by a knee of an infant, is simulated.

Figure 3:
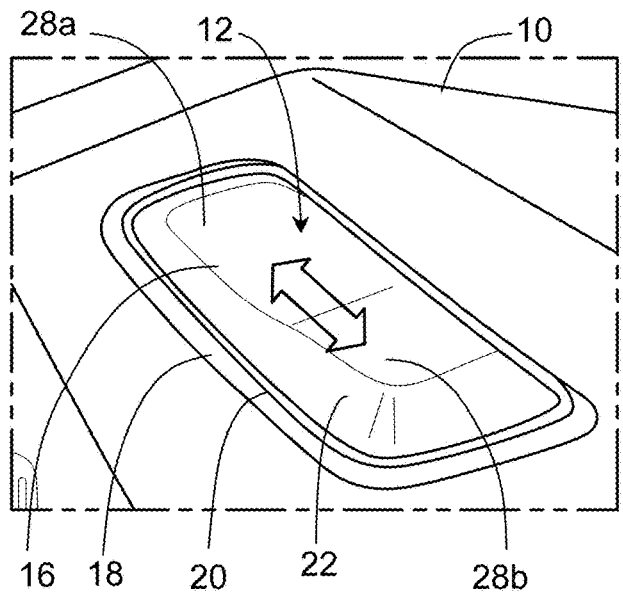
FIG. 3 is an enlarged detailed illustration of the rocker switching element of FIG. 1.

FIG. 3 shows an enlarged illustration of the rocker switching element 12 from FIG. 1. The rocker switching element 12 has, centrally, an actuation rocker 16 with two actuation regions 28a, 28b situated opposite one another on the longitudinal side, the mechanical actuation (for example by the finger of a user) of which in the example shown is able to cause an electrical sliding roof to open or to close, as indicated by the double block arrow in FIG. 3 on the actuation rocker 16.

Internally, this is realized by way of electrical switching elements, situated behind the rocker, with as short a stroke as possible (for example membrane switches or the like), the actuation rocker 16 being mounted so as to be centrally pivotable. Even if within the context of the present disclosure where mechanical switches may be preferred for safety reasons, it is of course also possible for contactless switch elements (for example capacitive proximity sensors) to be used in order to convert the actuation into an electrical signal.

Furthermore, with reference to FIG. 3, it can be seen from this enlargement that the recess is formed overall by two components: first the rigid panel edge region 18, which is of slightly goblet-like form, and second the likewise beveled edge region 22 of the actuation rocker. The panel edge region 18 and the edge region 22 of the actuation rocker are separated from one another by a gap 20 with a desired gap dimension of approximately 0.5 mm, according to one embodiment.

The specific geometry of this recess is explained in more detail below on the basis of the schematic (not necessarily true to scale) sectional illustration according to FIG. 4 (detailed illustration) and FIG. 5 (overall illustration). The illustrations show a section through a rocker switching element 12 in the transverse direction, that is to say, along a plane which is transverse to the block arrow of FIG. 3. As can be seen from FIG. 5, a test body, indicated with "14," is not quite able to touch the actuation rocker 16, whereas this is possible, even at the edge of the actuation rocker 16, with a schematically indicated finger 24. A very smooth, optically appealing design, with good operability and without obstructive ribs or the like, is thus created.

Figure 5:
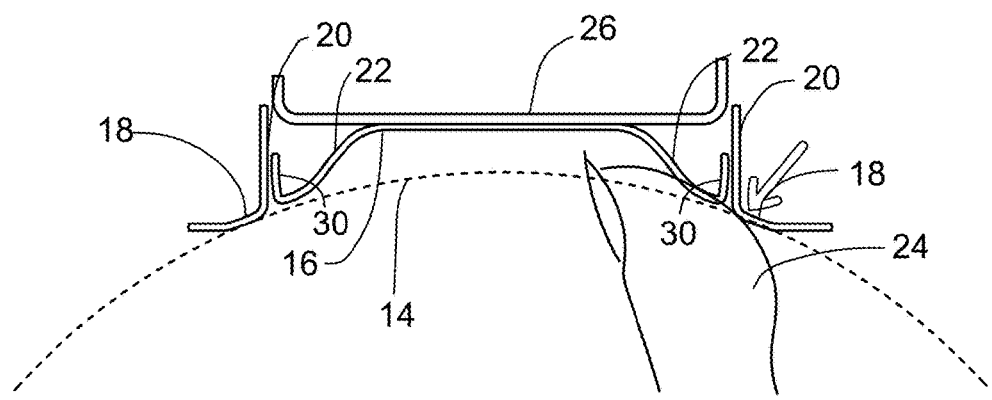
FIG. 5 is a sectional illustration of FIG. 4 in overall view.

For comparison, a (hypothetical) planar switching element according to the prior art is illustrated in FIG. 5 with "26." In reality, however, the actuation rocker 16 and the planar switching element 26 are not present simultaneously. As can be seen, in the case of the planar switching element 26, relatively significant indentations would arise, and this would make the operability, in particular when operating without visual checking, difficult.

Figure 4:
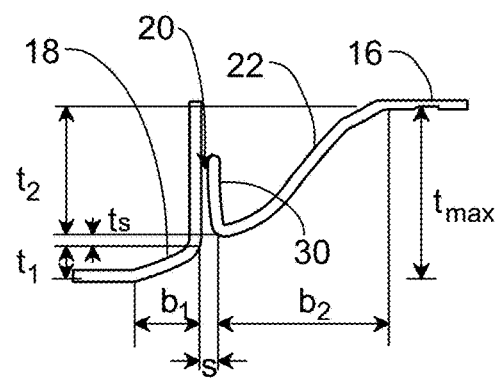
FIG. 4 is a schematic partial sectional representation through the rocker switching element according to one embodiment with an indication of the measured variables.

In FIG. 4, the individual measure variables at the example of the left edge of FIG. 5 are illustrated. This applies correspondingly—although not necessarily with quantitatively identical variables—to the remaining sides. From left to right, the overhead panel transitions into a curvature in an edge region 18 over a section $b_1$ and is set back by a depth $t_1$ in the process. Situated adjacent to this (further to the right in FIG. 4) is the actuation rocker 16, which is separated from the edge region 18 by a gap 20 such that the actuation rocker can move according to the predefined switch stroke. The actuation rocker has vertical limbs 30 adjacent to the gap.

The actuation rocker is set further back with respect to the panel plane, specifically over a section $b_2$ and by a further second depth $t_2$. In order for the gap 20 for the actuation rocker 16 to adjoin the edge region 18 without a perceptible step, the actuation rocker 16 adjoins not exactly at the first depth $t_1$ but, due to the gap, by a small distance $t_s$ deeper. This therefore results in the total depth $t_{max}=t_1+t_s+t_2$; the depth is reached over the width $b_1+s+b_2$. As can be seen from FIGS. 4 and 5, the recess is implemented in curve form and overall without abrupt changes in angle. The maximum angle with respect to the horizontal is thus approximately 45°. Overall, the result is a curve (interrupted by the gap 20) which, in view of the transition into the horizontal at both ends and an angle of 45° approximately at the center, can be best approximated by a tangent function. In this case, the recess is ultimately formed overwhelmingly by the actuation rocker 16, that is to say $b_2$ and $t_2$ are larger than $b_1$ and $t_1$.

According to one embodiment, a rocker switching element has an actuation rocker which is formed as a switch or button with at least two, preferably three, switching positions and is arranged on a control panel, the control panel being of substantially planar form at least in its panel edge region adjoining the rocker switching element, and the actuation rocker being arranged so as to be recessed such that it does not project beyond the panel edge region at least in the non-actuated state.

In this case, with regard to the height profile, the transition between the panel edge region and the actuation rocker, and also the actuation rocker, is formed in section as follows: Starting from the surrounding panel level, the panel edge region forms over a first width $b_1$ a goblet-like edge or angled edge which is set back by a first depth $t_1$, and the adjoining edge which may be an angled edge, separated by a gap of width s, of the actuation rocker, which edge is recessed by slightly more than the first depth $t_1$ in the non-actuated state, is, in (non-stepped) continuation of the goblet-like recess, set further back continuously over a second width $b_2$ by a second depth $t_2$ until a maximum depth $t_{max}$ is reached, the recess being shaped overall such that inadvertent actuation of the actuation rocker by an object or a body part which is significantly larger than a human finger is prevented.

The actuation rocker is thus arranged here so as to be recessed in order to prevent inadvertent actuation, this being achieved firstly in that the actuation rocker is surrounded by a goblet-type edge and is recessed approximately by a first depth $t_1$. Secondly, the recess also continues on at the actuation rocker itself such that this is given a substantially concave shape. Consequently, when the intended test body strikes against the edges of the recess, it cannot reach or touch, even centrally, the substantially concavely formed actuation rocker. Moreover, "substantially concave" is in this context intended to indicate that there could in principle also be regions, for example centrally on the actuation rocker, which, with respect to the edge regions, again have a smaller depth provided that the requirements for the protection against inadvertent actuation are still met.

The aforementioned variables $b_{1,2}$ and $t_{1,2}$ and also the gap dimension s may be constant along the circumference of the actuation rocker, but this is not explicitly necessary. Instead, these variables may also vary along the circumference, provided that the protection against inadvertent contact according to the test requirements remains ensured in each case. One such variation of the variables is for example necessary if an arrangement of an actuation rocker that is slightly angled with respect to an overhead panel is desired (it then being possible to compensate if the overhead panel itself is not aligned completely horizontally in this region). Furthermore, when determining the respectively necessary recess dimension, it may also be taken into consideration that, for example (exactly) in the center of a rocker switch, no effective actuation of the same can occur purely mechanically, which is why a test body, if appropriate, does not need to be kept away as strongly there as at the two ends of the actuation rocker.

Where a rocker switching element for a sliding roof is referred to in relation to this invention, this does not mean, incidentally, that the application of the present invention would have to be restricted to that case. The invention is suitable for example also for actuation switches for electrical window lifters or for a multiplicity of further switches and buttons, and also outside motor vehicle engineering. In principle, instead of a rocker, it is possible to provide a pure switch.

In one embodiment, in order to avoid hard edges, the profile of the recess is formed with angles of not more than 60°, preferably not more than 45°, with respect to the panel plane. Consequently, a practically edge-free, esthetically appealing and easily operable switch arrangement is realized, and the risk of injury, in particular in crash situations, is minimized.

Preferably, the second width $b_2$ is selected to be at least twice as large as the first width $b_1$, and the second depth $t_2$ is selected to be at least twice as large as the first depth $t_1$. Particularly in one embodiment, the variables $b_2$ and $t_2$ are even two to five times as large as $b_1$ and $t_1$, respectively. Consequently, the recess is largely provided by the actuation rocker, and this improves the operability of the rocker since, as a result, even when touching the flanks of the actuating rocker, a switching operation may already be triggered.

The gap width s between the panel edge region and the edge of the actuation rocker is preferably less than 1 mm, preferably approximately 0.5 mm. Such a small gap dimension ensures that a valuable impression is conveyed and any penetration of dirt into, or visibility of dirt in, the spaces behind the gaps is avoided.

The recess is preferably, as mentioned, geometrically shaped overall such that a test body (ball with a diameter of 40 mm), which is intended to be representative of a knee or an elbow of a child, cannot touch the actuation rocker.

Preferably, the actuation rocker is formed as a rocker switch with three switching positions, namely two touch positions and a central rest position, and the rocker switching element is used as an actuation element for a sliding roof in an overhead console in the interior of a motor vehicle.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A rocker switching element as a control element in motor vehicle interiors, comprising:
   an actuation rocker formed as a switch with at least two switching positions; and
   a control panel of substantially planar form at least in its panel edge region adjoining the rocker switching element, the actuation rocker arranged on the control panel to be recessed such that it does not project beyond the panel edge region at least in the non-actuated state, wherein with regard to a height profile, a transition between the panel edge region and the actuation rocker is formed in section as follows:
   starting from a surrounding panel level, the panel edge region forms over a first width a goblet-like edge which is set back by a first depth, and an adjoining edge, separated by a gap, of the actuation rocker, which edge is recessed by slightly more than the first depth in the non-actuated state, is, in continuation of the goblet-like recess, set further back continuously over a second width by a second depth until a maximum depth is reached, the recess being shaped overall such that inadvertent actuation of the actuation rocker by an object which is significantly larger than a human finger is prevented, wherein the profile of the recess is formed with angles of not more than 60° with respect to the panel plane.

2. The rocker switching element as claimed in claim 1, wherein the profile of the recess is formed with angles not more than 45° with respect to the panel plane.

3. The rocker switching element as claimed in claim 1, wherein the second width is at least twice as large as the first width, and the second depth is at least twice as large as the first depth.

4. The rocker switching element as claimed in claim 1, wherein the gap width between the panel edge region and the edge of the actuation rocker is less than 1 mm.

5. The rocker switching element as claimed in claim 4, wherein the gap width between the panel edge region and the edge of the actuation rocker is less than 0.5 mm.

6. The rocker switching element as claimed in claim 1, wherein the recess is geometrically shaped such that a test ball with a diameter of 40 mm, which is intended to be representative of a knee or an elbow of a child, cannot touch the actuation rocker.

7. The rocker switching element as claimed in claim 1, wherein the actuation rocker is formed as a rocker switch with three switching positions.

8. The rocker switching element as claimed in claim 7, wherein the three switching positions comprise two touch positions and a central rest position.

9. The rocker switching element as claimed in claim 1, wherein said element is used as an actuation element for a sliding roof in an overhead console in the interior of a motor vehicle.

10. A rocker switching element comprising:
an actuation rocker formed as a switch with at least two switching positions and recessed in a substantially planar control panel, wherein a panel edge region forms over a first width a first edge set back by a first depth, and an adjoining second edge is separated by a gap and recessed more than the first depth and set further back continuously over a second width by a second depth, the recess being shaped overall such that inadvertent actuation of the actuation rocker by an object which is significantly larger than a human finger is prevented, wherein the profile of the recess is formed with angles of not more than 60° with respect to the panel plane.

11. The rocker switching element as claimed in claim 10 wherein the profile of the recess is formed with angles not more than 45° with respect to the panel plane.

12. The rocker switching element as claimed in claim 10, wherein the second width is at least twice as large as the first width, and the second depth is at least twice as large as the first depth.

13. The rocker switching element as claimed in claim 10, wherein the gap width between the panel edge region and the edge of the actuation rocker is less than 1 mm.

14. The rocker switching element as claimed in claim 13 wherein the gap width between the panel edge region and the edge of the actuation rocker is less than 0.5 mm.

15. The rocker switching element as claimed in claim 10, wherein the recess is geometrically shaped such that a test ball with a diameter of 40 mm, which is intended to be representative of a knee or an elbow of a child, cannot touch the actuation rocker.

16. The rocker switching element as claimed in claim 10, wherein the actuation rocker is formed as a rocker switch with three switching positions, wherein the three switching positions comprise two touch positions and a central rest position.

17. The rocker switching element as claimed in claim 10 wherein said element is used as an actuation element for a sliding roof in an overhead console in the interior of a motor vehicle.

* * * * *